3,385,357
COMBINED HEATED TRAY AND CARVING BOARD
Frederick J. Burg, Bellrose, N.Y., assignor to Salton, Inc., New York, N.Y., a corporation of New York
Filed Apr. 15, 1966, Ser. No. 542,958
2 Claims. (Cl. 165—185)

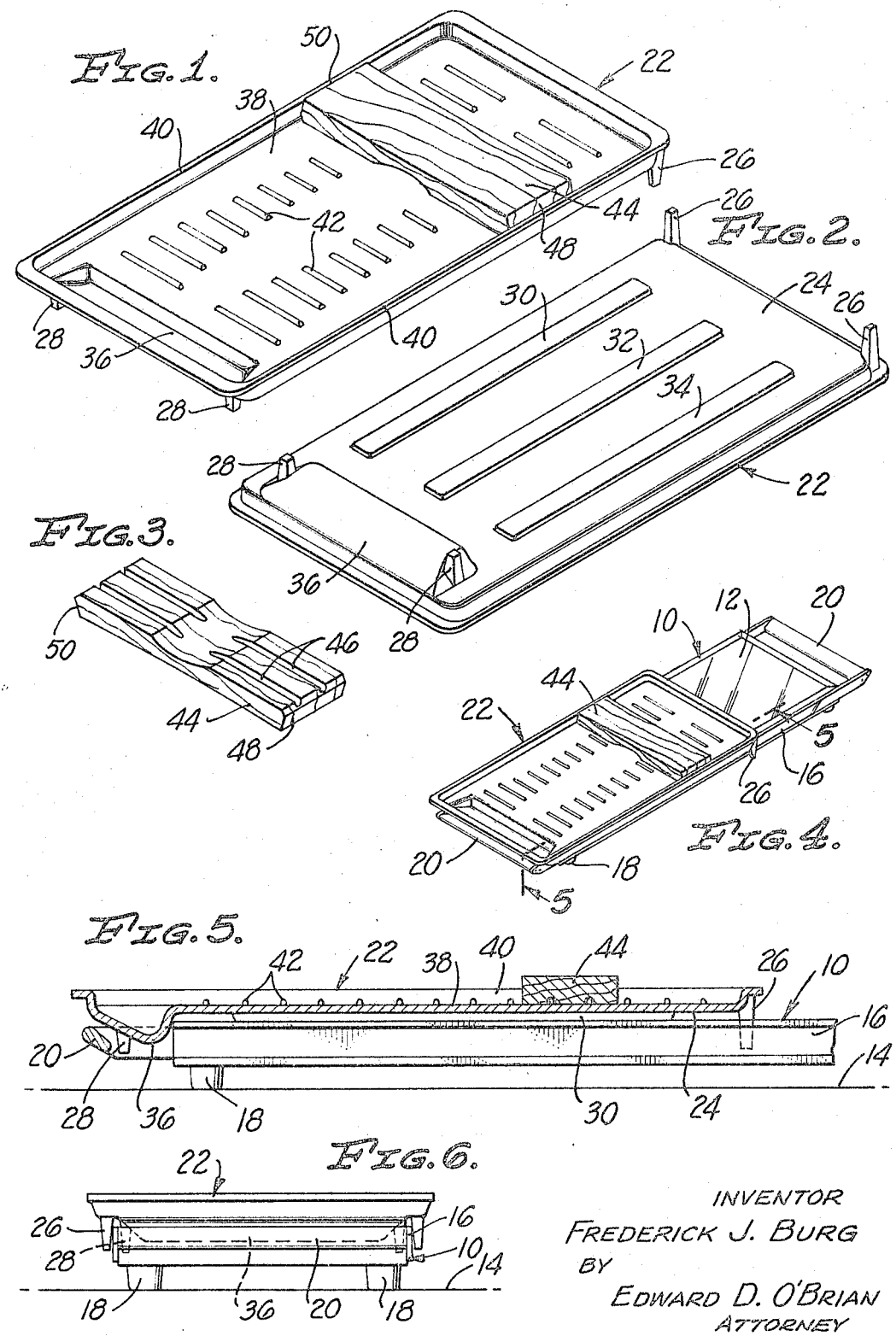

ABSTRACT OF THE DISCLOSURE

A combined heated tray and carving board structure is disclosed. The tray has a plurality of ribs which are adapted to fit correspondingly spaced grooves in the carving board. This board is adapted to be located at various locations along the length of the tray by certain of the ribs engaging the grooves in the cutting block or board, thus inhibiting motion of the cutting block along the length of the tray.

---

This invention is directed to a combined heated tray and carving board and particularly a heated tray receiving heat at a predetermined sufficient rate to maintain heated food items thereon at relatively constant temperature, and a carving board associated therewith to aid in the cutting of food items which are maintained in the heated condition.

The serving of food items, particularly those which are desirably served in a heated condition, is a difficult process when it is desired that the food items reach the consumer in the most palatable, heated condition. Some effort has been made in the past to maintain warm heated food items until they are served for consumption. Steam tables fall into this class. However, steam tables have proven themselves incapable of maintaining foods palatable, while they are maintaining them warm, because they continue the cooking of the food items. Furthermore, heavy, heated plates are used in many, particularly European, gourmet establishments to maintain the temperature of food items while they are being served. Such an approach is a disadvantage of heating those items on the plate which may be more desirably cold. However, no proper solution has been found for the maintenance of food items at proper, desirable, non-cooking temperatures during carving and immediately prior to serving.

Accordingly, it is an object of this invention to provide a combined heated tray which is properly associated with a heat source in such a manner that it receives heat at an appropriate rate to maintain warm food items on the tray while maintaining them below a cooking temperature so as to permit serving of such food items over a relatively long period of time and maintain them at the desired serving temperature.

It is a further object of this invention to provide a carving board in association with a heated tray so that carving may proceed and carved material maintained warm on the tray during the carving operation and subsequent thereto.

It is a further object of this invention to provide a heated tray which receives heat from an appropriate heat source which supplies both conductive and radiant heat and maintain the conductivity area at such an amount as to maintain the tray temperature warm enough for palatable serving of warmed food items and yet limited enough so that the temperature of the tray does not continue cooking the food items.

It is a further object of this invention to provide tongues and grooves on the heated tray and carving board arranged in such a manner that the carving board can be variously placed upon the heated tray and maintained in position against sliding along the heated tray so as to aid in carving food items upon the heated tray.

Other objects and advantages of this invention will become apparent from a study of the following portion of this specification, the claims and the attached drawings in which:

FIG. 1 is a top isometric view of the heated tray and combined carving board of this invention;

FIG. 2 is a bottom isometric view of the heated tray of this invention;

FIG. 3 is a bottom isometric view of the carving board of this invention;

FIG. 4 is an isometric view of the heated tray and carving board mounted in associated with a heated panel which supplies heat to the heated tray;

FIG. 5 is an enlarged section taken generally along the line 5—5 of FIG. 4; and

FIG. 6 is a left end elevational view of the structure shown in FIG. 5.

As an aid to understanding this invention it can be stated in essentially summary form that it is directed to a combined heated tray and carving board, which heated tray is used in association with a heated panel which supplies heat to the tray. The heated panel has a generally planar top surface and has edges and ends. The heated tray engages with the heated top surface of the panel in a limited contact area. The heated panel keeps the tray warm both by radiant and conductive heat. The conductive heat areas in contact with the heated panel are of such dimension as to maintain the tray temperature at a point where food items positioned thereon are maintained warm but are not further cooked. The amount of heat transferred is approximately sufficient to equal the heat loss of the food items on the tray. The tray engages over the edges of the heated panel so as to maintain the tray in position. Furthermore, the tray interlocks at one end of the panel so as to prevent relative longitudinal motion. The upper surface of the tray, on which the food items are placed, has a plurality of transverse ribs. These ribs aid in preventing the sliding of food items thereon. Furthermore, a carving board is provided. This carving board has grooves in the bottom thereof to engage the ribs upon the tray so as to prevent longitudinal sliding of the carving board. Furthermore, the carving board engages between raised edges of the heated tray so as to prevent transverse sliding.

This invention will be understood in greater detail by reference to the following portion of this specification wherein the drawings are described. The heat source for the combined heated tray and carving board is an appropriately supported plate. The heated plate is preferably the top plate of electrically powered food warmer 10. The food warmer 10 has a warmed top plate 12 which is preferably in the form of appropriately treated glass having an electrical resistance heater bonded to the lower side of the glass. The glass is preferably of such nature that it provides minimum obstruction to radiant heat transfer. When the heating coils on the lower side of the glass of warmed plate 12 are connected to an electrical power source of appropriate value, the conductors become heated through the electrical resistance thereof. This heat radiates through the glass and also warms the glass by conduction.

The warmed plate 12 is supported above table top 14 by means of external framework 16 of food warmer 10. Legs 18 on framework 16 provide the support therefor. Framework 16 extends all the way around warmed plate 12, and defines a substantially rectangular frame therefor. Thus, edges and ends are defined. Furthermore, the framework 16 extends past the ends of warmed plate 12 to define handles 20 which are positioned beyond the ends of the main portion of framework 16 to define openings.

Heated tray 22 is arranged to be positioned upon the top of warmed plate 12 for restricted movement with respect thereto. The bottom of heated tray 22 is defined by the plane of bottom 24. Extending below bottom 24 are legs 26 at one end thereof and legs 28 at the other end thereof. These legs terminate in a common plane substantially parallel to the plane of bottom 24. Furthermore, bosses 30, 32 and 34 are integrally formed with heated tray 22 and extend below the plane of bottom 24. Bosses 30, 32 and 34 terminate substantially in a plane which is preferably parallel to the plane of bottom 24, and does not extend as far away from the bottom 24 as the termination of legs 26 and 28. The bosses 30, 32 and 34 are adapted to lie against the top of warmed plate 12. Also extending downward from the bottom of tray 22 is juice receptacle 36. Juice receptacle 36 and legs 28 are positioned to extend over the end of the main portion of frame 16 and into the opening defined by handle 20. Furthermore, legs 26 are positioned to embrace the edges of main frame 16. This positioning is such that the heated tray 22 cannot move endwise and cannot move sidewise with respect to food warmer 10. However, heated tray 22 can move in a generally upward direction away from the top of food warmer 10.

Functional relationship between the food warmr 10 and heated tray 22 is such that the amount of heat added to bottom 24 by radiation from plate 12 and added through bosses 30, 32 and 34 through conduction from plate 12 is such that heat is added to heated tray 22 at a rate such that heat transfer from heated tray 22 to a heated food item placed thereon substantially equals the heat loss from the food item. Therefore, the food item is maintained substantially at the temperature at which it was placed upon tray 22. This temperature is sufficiently warm to maintain the food item desirably palatable, but is sufficiently low in temperature so as to prevent further cooking or substantial drying of the food item. The desirable maintained temperature of the food item is substantially 120 to 180° F. Such is regulated by the amount of conductivity and radiation into the bottom of the heated tray from the warmed plate 12.

The top of tray 22 is best seen in FIGS. 1 and 5. The top of tray 22 has a receptacle surface 38 which is substantially parallel to bottom 24. Rectangular edges 40 extend upward from the surface 38. At one end, receptacle surface 38 terminates at juice receptacle 36, and one end edge 40 extends around the juice receptacle 36. Upstanding ribs 42 extend at least part way across surface 38. They are substantially parallel to the end and are at substantially right angles to the longitudinal edges 40. These ribs have two functions. The first function is to aid in preventing sliding of food items placed upon tray 22. The second is to prevent sliding of cutting block 44. The material of tray 22 is preferably metal, and cast aluminum is preferred for its heat transfer and rust-free properties.

Ribs 42 are equally spaced longitudinally of tray 22, and cutting block 44 has grooves 46 in the bottom thereof of equal spacing. Thus, as is shown in FIGS. 5, ribs 42 engage in grooves 46 of cutting block 44. Cutting block 44 terminates in ends 48 and 50 which are spaced apart slightly less than the distance between longitudinal edges 40. Thus, when the cutting block is in position, it is restrained from motion both crosswise and longitudinally of tray 22. The cutting block permits ease of cutting of articles which are maintained at temperature upon tray 22. Furthermore, after the cutting of food articles is completed, the cut portions may be retained on tray 22 until served so that their temperature is properly maintained.

Tray 22 and cutting block 44 have been described above in their preferred environment, positioned in association with a food warmer 10. However, it is clear that tray 22 is useful for other purposes. For example, tray 22 can be used for the direct broiling of meat under a conventional overhead radiant broiler. After such broiling, tray 22 can be moved to a serving location, cutting block 44 placed thereon so that cutting and serving can be directly accomplished from tray 22. In this use, it is used without food warmer 10. Similarly, tray 22 can be used for roasting, with the roasting immediately followed by carving with the aid of cutting block 44. These applications suggest the use of tray 22 as a vessel in which the cooking actually occurs. However, tray 22 is also useful for cutting cold materials. For example, a precooked ham can be stored in the refrigerator on tray 22, and when serving is desired the tray is placed in a serving location, and with the aid of cutting block 44 the ham is sliced. In addition, tray 22 is excellent for use with non-meat food articles. For example, a pineapple can be cut and sliced upon cutting block 44 and the tray 22 can be used to retain the pieces. In this application, juice receptacle 36 receives the juices of the fruit as it is cut. Other similar uses for the combination of tray 22 and cutting block 44 are also possible.

This invention having been described in its preferred embodiment, it is clear that it is susceptble to numerous modifications and embodiments within the scope of this invention without the exercise of the inventive faculty. Accordingly, the scope of this invention is defined by the scope of the following claims.

What is claimed is:

1. A heated tray, said heated tray having a bottom surface, engagement means on said heated tray, said engagement means extending below said bottom surface in an amount substantially equal to a first dimension, said engagement means terminating in a plane substantially parallel to the plane of said bottom surface, a plurality of spaced bosses extending below said bottom surface a second dimension lesser than said first dimension, said spaced bosses terminating in a plane substantially parallel to the plane of said bottom surface;

said engagement means being adapted to engage a warmable plate when said bosses are in contact with the warmable plate so that heat is adapted to be transferred to said bottom surface of said tray by radiation through spaces between said spaced bosses and by conduction through said spaced bosses so as to be adapted to maintain said tray at a temperature related to the temperature of the warmed plate, said tray having a top surface and raised edges around said top surface, said raised edges comprising longitudinal edges and end edges, said edges extending upward from said top surface, a plurality of ribs extending upward from said top surface of said tray, said ribs being positioned substantially parallel to said end edges, said ribs being substantially equally spaced along the length of said tray, and a cutting block positioned upon said top surface of said tray, said cutting block having ends and a bottom, said bottom of said cutting block having grooves therein, said grooves engaging over said ribs so as to inhibit motion of said cutting block longitudinally of said tray, said ends of said cutting block substantially engaging said raised longitudinal edges of said tray so as to inhibit transverse motion of said cutting block with respect to said tray.

2. A tray, said tray having a relatively planar receptacle surface, edges extending upwardly around the periphery of said surface, said edges being continuous so as to provide continuous sides around said surface, a plurality of ribs positioned on said receptacle surface and projecting upwardly therefrom, said ribs being substantially parallel to each other, a cutting block positioned upon said surface of said tray, said cutting block having ends and having a bottom, said bottom of said cutting block having grooves therein, said grooves engaging over said ribs so as to inhibit motion of said cutting block in a direction across the length of said ribs, said ends of said cutting block substantially engaging said raised edges of said tray so as to inhibit motion of said cutting block along the length of said ribs.

References Cited

UNITED STATES PATENTS

| | | | |
|---|---|---|---|
| 431,909 | 7/1890 | Mitchell | 146—215 |
| 1,733,450 | 10/1929 | Detwiller | 99—425 X |
| 1,998,944 | 4/1935 | Spake | 99—425 |
| 2,012,520 | 8/1935 | Rogers | 99—425 |
| 2,085,220 | 6/1937 | Howlett | 126—390 |
| 2,093,939 | 9/1937 | Strack | 219—433 X |
| 2,452,445 | 10/1948 | Ericsson | 146—215 |

FOREIGN PATENTS

| | | |
|---|---|---|
| 1,099,613 | 3/1955 | France. |
| 787,509 | 12/1957 | Great Britain. |
| 207,976 | 4/1960 | Switzerland. |

ROBERT A. O'LEARY, *Primary Examiner.*

A. W. DAVIS, JR., *Assistant Examiner.*